Sept. 11, 1962                    C. T. B. BJORCK                    3,053,070
                         ELECTRICALLY DRIVEN LAUNDRY MANGLE
Filed Dec. 3, 1957                                              2 Sheets-Sheet 1

INVENTOR.
Carl Thure Bertil Bjorck
BY

Sept. 11, 1962     C. T. B. BJORCK     3,053,070

ELECTRICALLY DRIVEN LAUNDRY MANGLE

Filed Dec. 3, 1957     2 Sheets-Sheet 2

INVENTOR.
Carl Tlure Bertil Bjorck
BY
Atty

United States Patent Office 3,053,070
Patented Sept. 11, 1962

3,053,070
ELECTRICALLY DRIVEN LAUNDRY MANGLE
Carl Thure Bertil Bjorck, Pipersgatan 32,
Stockholm, Sweden
Filed Dec. 3, 1957, Ser. No. 700,389
1 Claim. (Cl. 68—249)

The present invention relates to a laundry mangle, whose roller system comprises at least two rollers of which the feeding roller is adapted to be rotated in stationary bearings by an electric motor. The invention has for its chief object to provide an efficient, silent and easily operable mangle, and more particularly to prevent the accidents which often occur when using electrically driven mangles. After practical tests made before several authorities the mangle of this invention has been specially recommended as being safe. The structure of the mangle has also been highly recommended in other respects.

The mangle according to this invention is mainly characterized by the provision of a manually operated element in front of the mangle rollers, which element is combined with a cut-out and reversing switch connected in the electric circuit of the drive motor for closing and breaking the circuit and reversing the direction of rotation of the motor and mangle rollers.

According to the invention, the manually operated element combined with the switch is adapted when being unintentionally touched during mangling to break the circuit of the electric motor and so stop the mangle, in order to protect the operator against injury. Thus this element fills several purposes and replaces through its construction and disposition several otherwise requisite elements, so that a reduction of the number of elements and of the manufacturing and mounting costs as well as a safer mechanical operation are obtained.

Figure 1:
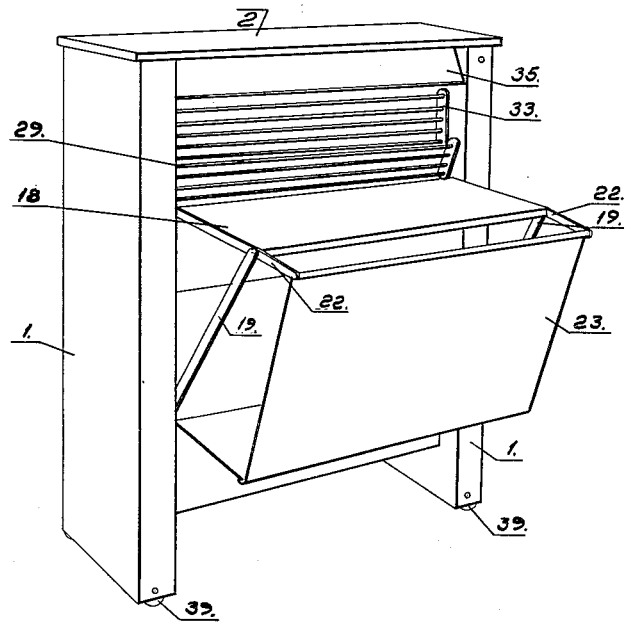
Figure 2:
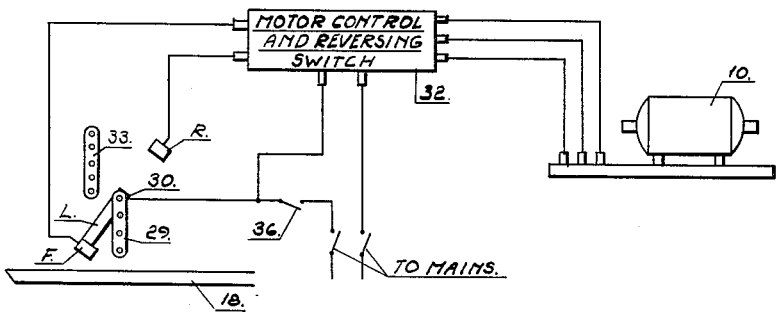
Figure 3:
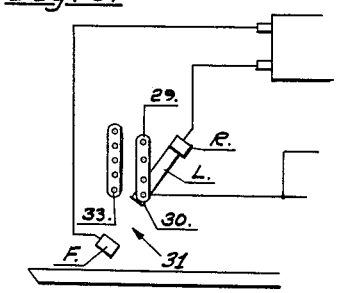
Figure 4:
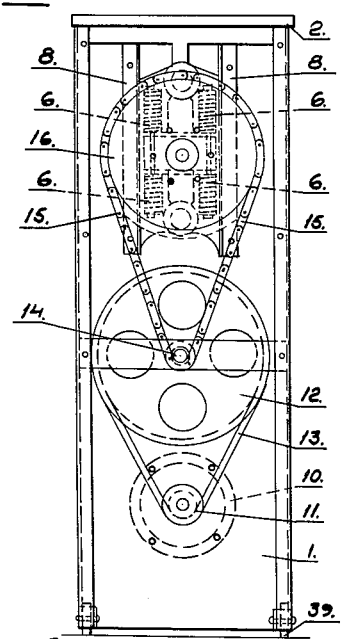
Figure 5:
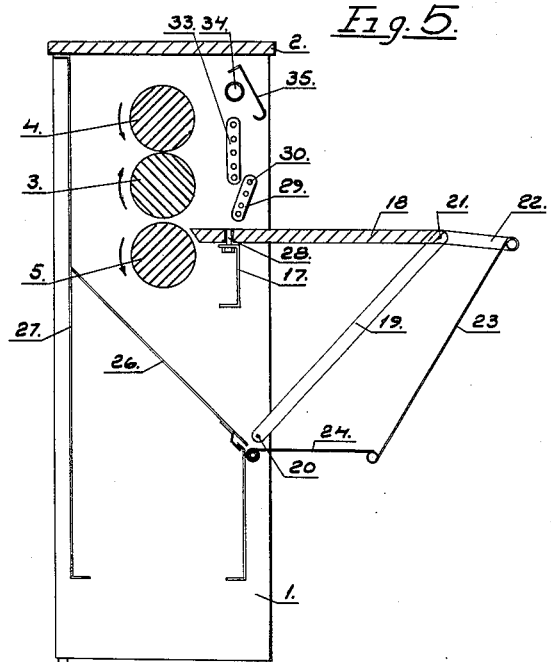

A mangle according to this invention and outstanding features of the same are described more closely in the following specification and illustrated in the accompanying drawings, in which FIG. 1 is a perspective view of the mangle, FIG. 2 is a wiring diagram showing the connection of the drive motor to the mains, and switches included in the current circuit, FIG. 3 shows one of the switches of FIGURE 2 in another position to effect reversal of the motor by a change in position of the manually operated elements, and FIGS. 4, 5, 6 and 7 are vertical sections through the mangle and vertical views of the gearing between the drive motor and the mangle rollers and of the bearings of the latter.

Referring now to the drawings, the numeral 1 designates side walls preferably made of sheet metal, of a closet-like casing, which is provided with a top cover 2, preferably made of wood. In the upper portion of the casing a mangle roller 3 is mounted to rotate in stationary bearings, which are fastened to carrying means in the casing. Mounted to rotate in bearings 7 are rollers 4 and 5, which are adapted to be pressed against the roller 3 by springs 6. The bearings 7 can slide diametrically to the roller 3 in guides 8 fastened to the casing. The helicoidal draw springs 6 are connected with the bearings 7 of the rollers 4 and 5 and with the stationary bearing holder 9 for the driven roller 3. The rollers 4 and 5 are each provided with a steel axle, which is placed in a central bore in each roller and protrudes from the roller end. The protruding shaft ends are journaled in ball bearings mounted in the slidable bearing holders 7. By providing two springs 6 acting on each bearing holder 7 for the rollers 4 and 5, the springs can be made weak and highly uniform, so that they will press the said rollers with uniform force against the driven roller 3.

The numeral 10 is an electric motor and 11 is a belt pulley or rope pulley fastened to the motor shaft. 12 is a belt or rope pulley to which the motor power is transmitted by a belt or rope 13. The shaft of pulley 12 carries a chain gear 14, which transmits driving power via a chain 15 to a chain wheel 16 fastened to one shaft end of the roller 3. The belt pulley 12, the chain gear 14 and the chain wheel 16 constitute a transmission between the motor 10 and the mangle roller 3.

A U-girder 17 is provided in the mangle casing in front of the mangle roller 5. The girder carries a board 18 which is disposed at such a height that its top surface is approximately flush with the laundry feed aperture between the two rollers 3 and 5. The board 18 is hinged and is supported by two stays 19 in the horizontal position. The stays 19 are pivoted to the side walls 1 at 20 and to the board at 21. The board 18 is adapted to be mounted on carriers 22, which extend somewhat past the front edge of the board. The carriers 22 also carry a downwardly and inwardly extending shield 23 of sheet metal or some other suitable material. The shield 23 is hinged to the ends of the carriers 22 or to a rod fixed to these ends. The lower edge portion of the shield 23 is bent upward and inward so as to form a fold with U-shaped cross section. The fold receives and supports the outer, downwardly bent edge portion 25 of an approximately horizontal plate 24, which is hinged to the side walls 1. In the mangle casing there is another shield 26 of sheet metal or other suitable material, which has its rear edge resting against the rear wall 27 of the casing and slopes forward towards the open casing front. When the shield 23 and the plate 24 are in the swung-out position they form together with the shield 26 a chamber in which mangled garments are collected. Two pins 28 protruding from the top surface of the girder 17 are adapted to enter holes in the board 18 to retain the board in a desired position in front of the mangle rollers.

The current circuit of the electric motor 10 is closed and opened by a switch 31, which is automatically controlled by a finger protecting grate 29 provided in front of the driven mangle roller 3. The grate is journalled in the mangle casing by means of pivots 30 extending from the grate ends in the longitudinal direction of the grate. One of the pivots 30 is adapted to actuate the switch 31 so that it closes the circuit to the electric motor when the grate is swung downwards into vertical position and the switch arm L engages the contact F and breaks the circuit when the grate is swung into the horizontal position. The switch 31 also serves as a reversing switch and is adapted to reverse the direction of rotation of the electric motor 10 when the grate 29 is swung upwards into a vertical position, so that the arm L engages reversing contact R as in FIGURE 3. In the wiring diagram shown in FIG. 2 the reverser is designated by the numeral 32. The switch 31 is also so adapted and combined with the grate 29 as to break the circuit when the grate is swung past a certain angle from the vertical plane from its down-swung vertical position, depending on the arcuate length of the contact F. This arrangement serves to stop the mangle in case the grate is unintentionally touched and thus protects the operator against injuries. Immediately above the pivoted grate 29 is a stationary protecting grate 33. The mangle rollers 3, 4 and 5 are enclosed in a chamber formed by the top cover 2, rear wall 27 and the grates 29 and 33.

Rollers 4 and 5 are pressure rollers which, among other things, prevent the bending of feed roller 3. When the mangle operator unintentionally touches the grate 29 in a direction towards the rollers, this touch stops the motor 10. Thus the mangle operator can never get his fingers between the rollers because the grate 29 with its switch protects him. When the grate 29 is swung into a horizontal position, it also stops the motor 10, but this is only when the laundry is ready to be taken out of the mangle. When the grate 29 is swung away from the rollers into an upwardly extending vertical position, it reverses the direction of rotation of the motor 10 and, thereby, the rollers.

In the top portion of the mangle casing is an illuminating tube 34 and in front of it a shade 35.

Figure 6:
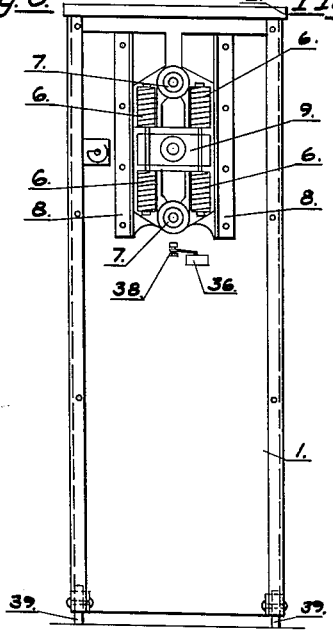
Figure 7:
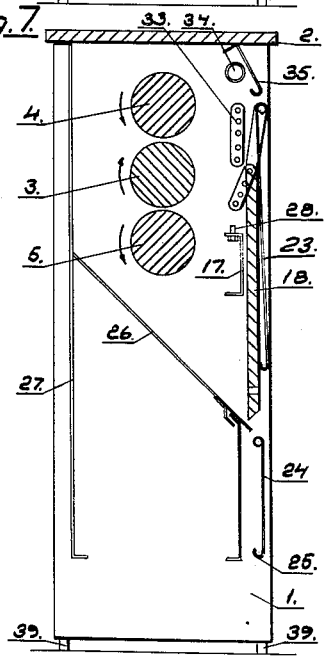

As shown in FIGS. 2 and 6, the numeral 36 designates a switch located below and near one bearing 7 of the lower mangle roller 5. This switch serves to break the circuit to the electric motor 10 when too thick a charge of garments is fed in between the rollers 3, 4 and 5, thus stopping the mangle and preventing its overload. The switch 36 (shown diagrammatically in FIG. 2) is provided with a sensing member 38, so that a depression of this member will cause the switch 36 to break the circuit. The switch 36 is so disposed below the bearing 7 that the latter on being pressed downwards by overload will in its turn depress the sensing element 38, which then actuates the switch 36 so that the circuit is opened. The sensing element 38 is vertically adjustable relative to the bearing 7.

The mangle roller 3 driven by the electric motor 10 is provided with a mangle cloth, which can be wound on to and off the roller, and on which the garments to be mangled are placed. When mangling, the motor is started by swinging the grate 29 downwards into vertical position and stopped by swinging the grate outwards into horizontal position. The mangle cloth is wound off by swinging the grate 29 upwards into vertical position. The mangle casing is carried by wheels 39.

It should be understood that the invention is not confined to the embodiment described above and illustrated in the drawings, as modification of details are possible without abandoning the spirit of the invention.

I claim:

A laundry mangle, comprising a mangle casing, three opposed contacting rollers having axes in a common plane, the middle roller being a feed roller, bearings fast with respect to the casing for the feed roller and an electric motor for driving the feed roller, slidable bearings mounted slidably with respect to the casing for carrying the two other rollers, resilient elements on the fast bearing for action on the slidable bearings to urge said two other rollers against the feed roller, said resilient elements being adapted to urge in pairs said two rollers against said feed roller, a manually operated protective member in the form of a grate arranged in front of said rollers, pivot members extending from said grate ends in the longitudinal direction of said grate for swingably journalling the grate in the mangle casing for the grate normally to hang in a generally vertical position, a motor control reversing switch in the circuit of the motor for stopping the motor and reversing the direction of rotation thereof, and means operationally connected to one of the pivot members and switch for stopping the motor and rollers when the grate is swung to a position away from its normal vertical hanging position and reversing same when the grate is swung to a vertical position approximately 180 degrees from its normal hanging vertical position.

References Cited in the file of this patent

UNITED STATES PATENTS

| | | |
|---|---|---|
| 176,230 | Leach | Apr. 18, 1876 |
| 339,230 | Stanbrough | Apr. 6, 1886 |
| 1,220,043 | Wright | Mar. 20, 1917 |
| 1,465,348 | Cox | Aug. 21, 1923 |
| 1,485,323 | Wood | Feb. 26, 1924 |
| 1,746,053 | Rice | Feb. 4, 1930 |
| 1,755,481 | Lee | Apr. 22, 1930 |
| 2,180,238 | Hoke | Nov. 14, 1939 |
| 2,206,469 | Peterson | July 2, 1940 |
| 2,537,935 | Lundy | Jan. 9, 1951 |
| 2,595,710 | Schultz | May 6, 1952 |
| 2,701,463 | Daniels | Feb. 8, 1955 |

FOREIGN PATENTS

| | | |
|---|---|---|
| 554,794 | Belgium | Feb. 28, 1957 |
| 3,211 | Great Britain | of 1897 |
| 254,657 | Great Britain | July 8, 1926 |